(12) United States Patent
Wang et al.

(10) Patent No.: US 8,640,610 B2
(45) Date of Patent: Feb. 4, 2014

(54) SQUEEZE JUICER FOR EXTRACTING JUICE

(75) Inventors: Xuning Wang, Jinan (CN); Yanhua Wu, Jinan (CN); Long Chen, Jinan (CN)

(73) Assignee: Joyoung Company Limited, Jinan, Shandong (CN)

( * ) Notice: Subject to any disclaimer, the term of this patent is extended or adjusted under 35 U.S.C. 154(b) by 0 days.

(21) Appl. No.: 13/514,031

(22) PCT Filed: Jun. 23, 2010

(86) PCT No.: PCT/CN2010/074328
§ 371 (c)(1),
(2), (4) Date: Jun. 5, 2012

(87) PCT Pub. No.: WO2011/050619
PCT Pub. Date: May 5, 2011

(65) Prior Publication Data
US 2012/0266762 A1    Oct. 25, 2012

(30) Foreign Application Priority Data
Oct. 29, 2009   (CN) .......................... 2009 1 0229375

(51) Int. Cl.
*A23N 1/02*   (2006.01)
(52) U.S. Cl.
USPC ............................................. 99/510; 99/502
(58) Field of Classification Search
USPC ............ 99/501, 502, 509, 510, 513; 100/117, 100/131, 133, 134, 135; 241/74, 260.1
See application file for complete search history.

(56) References Cited

U.S. PATENT DOCUMENTS

| 5,381,730 A * | 1/1995 | Kim ................................. 99/510 |
| 8,091,473 B2 * | 1/2012 | Kim ................................. 99/510 |
| 2003/0154867 A1 | 8/2003 | Kim |

FOREIGN PATENT DOCUMENTS

| CN | 2065029 U | 11/1990 |
| CN | 1064004 A | 9/1992 |
| CN | 2263944 Y | 10/1997 |
| CN | 101355897 A | 1/2009 |
| CN | 201213690 Y * | 4/2009 |
| CN | 101697857 A | 4/2010 |
| DE | 2061415 | 5/1972 |
| DE | 3714518 A1 | 10/1988 |
| GB | 2224456 A | 5/1990 |

(Continued)

OTHER PUBLICATIONS

European Search Report.

*Primary Examiner* — Geoffrey S Evans
*Assistant Examiner* — John J Norton
(74) *Attorney, Agent, or Firm* — Kilpatrick Townsend & Stockton LLP

(57) ABSTRACT

A squeeze juicer for extracting juice includes a base (2), a motor (1), a juice collecting cavity (4), a squeezing and crushing part, and a filtering part (50). The squeezing and crushing part includes a propelling screw (3) and a squeezing cylinder (5) cooperating with the propelling screw (3). The squeezing cylinder (5) is provided in the juice collecting cavity (4). The filtering part (50) is provided on the downstream of the squeezing cylinder (5). The filtering part (50) includes a plurality of grids (51). A filtering slot (7) for pomace and juice is arranged between two adjacent grids (51). The size of the filtering slot (7) for pomace and juice can be accordingly changed corresponding to the size of the materials under the action of the propelling screw (3).

7 Claims, 4 Drawing Sheets

(56) References Cited

FOREIGN PATENT DOCUMENTS

| | | | |
|---|---|---|---|
| JP | 7-23848 | 1/1995 | |
| JP | 7023848 A | 1/1995 | |
| JP | 2005-124967 | 5/2005 | |
| JP | 2005124967 A | * | 5/2005 |
| JP | 2008104564 A | | 5/2005 |
| JP | 2008-104564 | | 5/2008 |
| JP | 2008104564 A | * | 5/2008 |
| KR | 10-2006-0102973 A | | 9/2006 |
| KR | 10-2006-0102974 A | | 9/2006 |
| WO | 00/74502 A1 | | 12/2000 |
| WO | 2005/041732 A1 | | 5/2005 |

* cited by examiner

SQUEEZE JUICER FOR EXTRACTING JUICE

The present application claims priority to International Application No. PCT/CN2010/074328, titled "SQUEEZE JUICER FOR EXTRACTING JUICE", filed on Jun. 23, 2010, which claims the benefit of priority to Chinese patent application No. 200910229375.4titled "EASILY CLEANABLE SQUEEZE JUICER", filed with the Chinese State Intellectual Property Office on Oct. 29, 2009. The entire disclosures thereof are incorporated herein by reference.

FIELD OF THE INVENTION

The present application relates to an easily cleanable squeeze juicer.

BACKGROUND OF THE INVENTION

A patent application No. CN101355897A published by the Chinese State Intellectual Property Office on Jan. 28, 2009 discloses a juicer. The juicer uses a screw to squeeze at a low speed, to maintain the nutrition and the inherent taste of the material juice to the greatest extent.

A filter cylinder of the juicer employs a mesh structure. Since large meshes can not effectively block material dregs, the meshes are generally designed to be small to separate the dregs from the juice. It is well known that, a small quantity of juice can not pass through the meshes timely if the meshes are small and will be absorbed by the material dregs, and then will be discharged out of the juicer. Thus, this kind of juicer has a low juice-squeezing efficiency and a low juice yield. In addition, small meshes are easy to be blocked by materials, and are much easier to be blocked by the materials when being operated for a long time and fed with the materials continuously, thereby the juice can not pass through the blocked meshes. Thus, it is not proper to feed the juicer with materials continuously for a long time. Besides, it is not easy to clean the blocked meshes since the meshes are small, and it is especially time-consuming and laborious to clean the meshes if the material dregs in the meshes are dried out.

In view of this, there is an urgent demand to improve the filtering portion of the prior squeeze juicer, such that the above drawbacks can be overcome.

SUMMARY OF THE INVENTION

In view of the above drawbacks, it is provided according to the present application an easily-cleanable squeeze juicer, juice-filtering gaps of which are changeable with dimensions of the materials, thus the easily-cleanable squeeze juicer has a high juice yield, is especially applicable to be fed with materials continuously for a long time, is easy to be cleaned, can result few foam where squeezing the fruit and vegetable, and can maintain the inherent color, taste and nutrition of the fruit and vegetable juice to the greatest extent.

For realizing the above objects, it is provided according to the present application the following technical solutions:

An easily-cleanable squeeze juicer, including a base, a motor, a juice-collecting chamber, a squeezing portion and a filtering portion. The squeezing portion includes a propelling screw and a squeezing cylinder cooperated with the propelling screw. The squeezing cylinder is provided in the juice-collecting chamber, and the filtering portion is provided at a position downstream of the squeezing cylinder. The filtering portion includes a plurality of bars and juice-filtering gaps are formed between each two adjacent bars.

The juice-filtering gaps are changeable with dimensions of materials under a squeezing action applied by the propelling screw to the materials. A range of a static value I of each juice-filtering gap is that $0 \leq I \leq 0.2$ mm.

The propelling screw is provided longitudinally or transversely.

The filtering portion and the squeezing cylinder are made into one piece.

One end of each bar is fixedly provided on an end portion of the squeezing cylinder, and the other end of each bar is free.

The filtering portion of the easily-cleanable squeeze juicer may also be realized by the following solutions.

The filtering portion further includes an annular supporting bracket, and one end of each bar is fixedly provided on an end portion of the squeezing cylinder, the other end of each bar is fixedly provided on the annular supporting bracket.

The filtering portion further includes a bracket, bars of the filtering portion are of annular shapes, and the bars are connected and are fixedly provided on an end portion of the squeezing cylinder via the bracket.

The filtering portion includes two groups of bars and an annular supporting bracket. One end of each bar in one group of bars is fixedly provided on an end portion of the squeezing cylinder, the other end thereof is free. One end of each bar in the other group of bars is fixedly connected to the annular supporting bracket, the other end thereof is free; free ends of the two groups of bars are insertedly connected with each other in opposite directions, and the juice-filtering gaps are formed between adjacent bars.

An auxiliary filtering portion is surroundingly provided on the filtering portion, the auxiliary filtering portion includes an auxiliary supporting bracket and a plurality of bars fixedly connected to the auxiliary supporting bracket, and the juice-filtering gaps are formed between adjacent bars.

A sectional shape of each bar is of a triangular shape, a trapezoidal shape, a circular shape, a rectangular shape, a rhombic shape, or an oval shape.

The juice-filtering gaps according to the present application are gaps formed between the bars, the bars are elastically deformable while the propelling screw squeezes the materials, thus the juice-filtering gaps can be changed dynamically.

The present application has advantageous effects, for example,

1. The filtering portion of the easily-cleanable squeeze juicer according to the present application employs a gap structure instead of the conventional mesh structure, the juice-filtering gaps are changeable with dimensions of materials under the squeezing action applied by the propelling screw to the materials, thereby the juice squeezed out can flow out via the gaps timely and smoothly, the squeezed material dregs have a flat shape and thus will not leak out from the gaps. Therefore the easily-cleanable squeeze juicer has a high juice-squeezing efficiency and a high juice yield, is especially applicable to be fed with materials continuously for a long time, and when an user wants to squeeze a lot of materials, there is no need for the user to frequently stop and disassemble the machine for cleaning, which improves the operating convenience.

2. The gap structure of the filtering portion is not easy to be blocked by the material dregs, thus is easy to be cleaned, and it is possible to clean the filtering portion by washing with tap-water.

3. Compared with the mesh structure, the gap structure of the filtering portion can reduce the opportunity that the juice contacts the air, therefore less foam is produced in the juice, and can reduce the opportunity that the juice rubs with the filtering portion, thereby can maintain the inherent color and taste of the juice to the greatest extent, and can reduce the nutrition loss.

Figure 1:
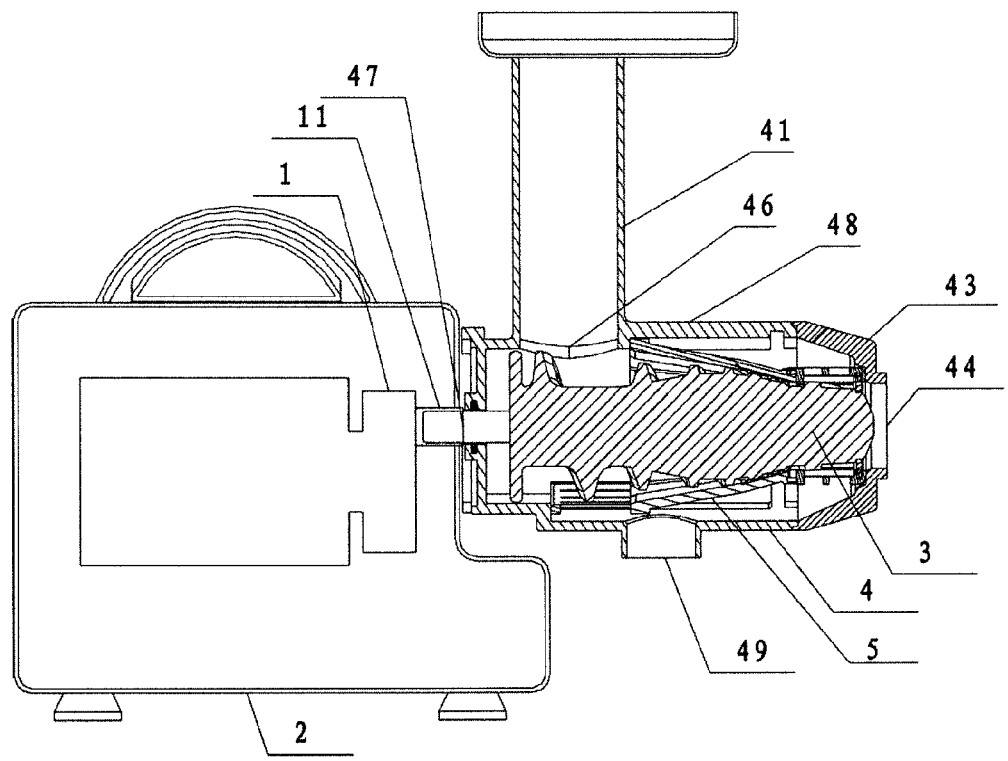
FIG. 1 is an easily-cleanable squeeze juicer according to a first embodiment of the present application.

Reference numerals of the components in the figures:

1 motor; 2 base; 3 propelling screw; 31 spiral member; 4 juice-collecting chamber; 41 feeding channel; 43 end cover; 44 dregs outlet; 45 chamber cover; 46 feeding inlet; 47 shaft hole; 48 chamber body; 49 juice outlet; 5 squeezing cylinder; 50 filtering portion; 51 bar; 52 crushing portion; 53 preposed filtering portion; 54 annular supporting bracket; 55 bracket; 60 auxiliary filtering portion; 61 bar; 62 auxiliary supporting bracket; 7 juice-filtering gap.

DETAILED DESCRIPTION OF THE EMBODIMENTS

The present application will be described in detail in conjunction with drawings and embodiments hereinafter.

As shown in FIGS. 1 to 9, the easily-cleanable squeeze juicer according to the present application includes a base 2, a motor 1, a juice-collecting chamber 4, a squeezing portion, and a filtering portion 50. The squeezing portion includes a propelling screw 3 and a squeezing cylinder 5 cooperated with the propelling screw 3. The squeezing cylinder 5 is provided in the juice-collecting chamber 4, and the filtering portion 50 is provided at a position downstream of the squeezing cylinder 5. The filtering portion 50 includes bars 51 which are elastically deformable. Juice-filtering gaps 7 are formed between adjacent bars 51. The juice-filtering gaps 7 of the filtering portion 50 can change adaptively with dimensions of materials under the squeezing action applied by the propelling screw 3 to the materials. A range of a static value I of each juice-filtering gap 7 is that 0≤I≤0.2 mm.

It should be noted that, the term "downstream" referred to in the present application is defined on the basis of the flowing direction of the materials in the juicer. It should be understood that, the term should not be construed to limit the protection scope of the present application.

A First Embodiment

In the easily-cleanable squeeze juicer according to a first embodiment of the present application, as shown in FIGS. 1 to 6, the propelling screw 3, the squeezing cylinder 5 and the filtering portion 50 are all provided transversely. Several spiral members 31 are provided on a surface of the propelling screw 3, the juice-collecting chamber 4 is located at a side of the base 2, the motor 1 is provided in the base 2 and is provided horizontally. The easily-cleanable squeeze juicer further includes a feeding channel 41 and an end cover 43, and a feeding inlet 46 is formed in a chamber body 48 of the juice-collecting chamber 4. The feeding channel 41 is integrally connected with the feeding inlet 46. A juice outlet 49 is further formed in the chamber body 48 of the juice-collecting chamber 4. One end of the juice-collecting chamber 4 is formed with a shaft hole 47, a motor shaft 11 passes through the shaft hole 47 to be connected to the propelling screw 3 provided in the squeezing cylinder 5. The end cover 43 is mounted on the other end of the juice-collecting chamber 4, and is surroundingly mounted on the filtering portion 50. A dregs outlet 44 is formed in the end cover 43, through which the material dregs are discharged out of the easily-cleanable squeeze juicer.

In the present embodiment, the squeezing cylinder 5 is a tapered cylinder, and a crushing portion 52 cooperated with the propelling screw 3 is provided in the squeezing cylinder 5. The crushing portion 52 is protrusions on an inner wall of the tapered cylinder, the filtering portion 50 is located at an end portion of an end, having a smaller diameter, of the tapered cylinder, and the filtering portion 50 and the squeezing cylinder 5 are formed integrally. In the present embodiment, a preposed filtering portion 53 configured to prevent the juice from spilling is further provided on the squeezing cylinder 5, and a plurality of elongated holes are provided in the preposed filtering portion 53. For saving material, the preposed filtering portion 53 is configured as a cambered surface structure provided with elongated holes. When materials containing a lot of juice are squeezed, juice is quickly squeezed, thus if the juice fills the squeezing cylinder quickly and can not be discharged out of the filtering portion 50 timely, the juice can flow out through the preposed filtering portion 53, which avoids a lot of juice accumulating in the squeezing cylinder 5 or being taken away by the dregs. In addition, where juice remained on the squeezing cylinder flowing back along the tampered surface of the squeezing cylinder, the remained juice can also flow out via the elongated holes in the preposed filtering portion 53.

Certainly, the person skilled in the art can understand that, optionally, the crushing portion 52 may also be extended to a lower end of the squeezing cylinder 5, the filtering portion 50 and a lower end of the crushing portion 52 are provided in parallel or at intervals, i.e., the squeezing cylinder 5 also acts as the filtering portion 50. According to the present application, the position of the filtering portion 50 is not limited to the above solution, and any equivalent modifications and improvements made based on the present application are deemed to fall into the protection scope of the present application defined by the claims, which will not be illustrated herein.

Figure 2:
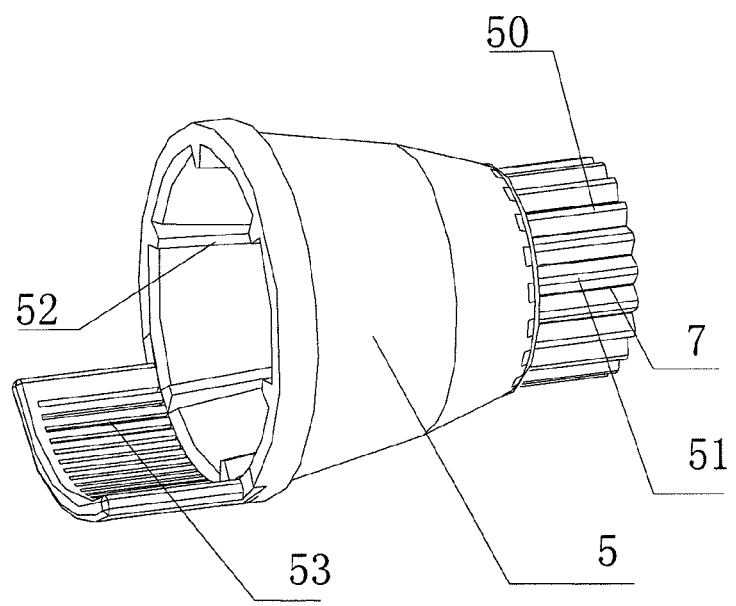
FIG. 2 is a first structure of a squeezing cylinder in FIG. 1.
Figure 3:
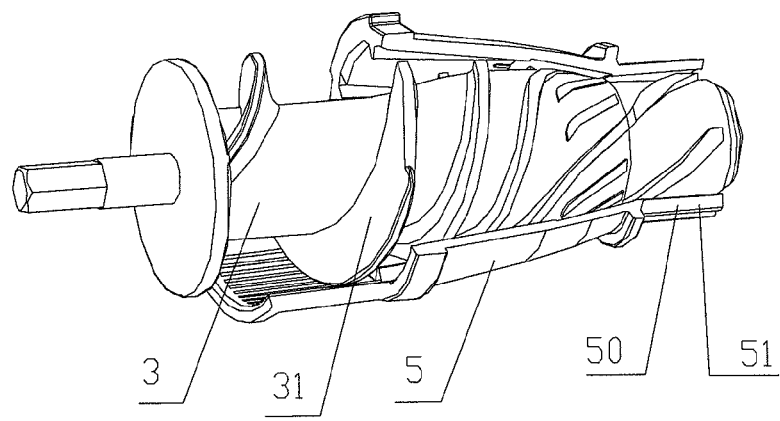
FIG. 3 is a schematic view showing the cooperation between the squeezing cylinder and a propelling screw of the easily-cleanable squeeze juicer in FIG. 1.

In a first embodiment of the filtering portion 50 according to the present application, as shown in FIGS. 2 and 3, one end of each bar 51 is fixedly provided on the end portion of the end, having a smaller diameter, of the tapered cylinder, the other end of each bar 51 is free. The end cover 43 restricts the free end of each bar 51, thus both ends of each bar 51 are restricted. During the juice squeezing process, a middle portion of each bar 51 will arch to form the juice-filtering gaps 7, the bars 51 and the juice-filtering gaps 7 are provided axially. A sectional shape of each bar 51 is of a trapezoid shape. In the present embodiment, a static value of each juice-filtering gap 7 is 0. Thus, when it needs to clean the filtering portion, the filtering portion can be easily cleaned since one end of each bar 51 is free, and if there are materials clamped between the grids 51, the materials can be easily removed by moving the bars 51 with hands.

Certainly, the person skilled in the art can understand that, optionally, the sectional shape of each bar 51 may also be triangular, trapezoidal, circular, rectangular, rhombic or oval. The bars 51 may be straight bars, or oblique bars, S-shaped bars or bars having other shapes. The bars 51 may be made of elastic material. The principle lies in that adjacent bars 51 can form juice-filtering gaps 7 which can be dynamically changed, thus the bars 51 are not limited to specific shapes or materials.

During the juice squeezing process of the easily-cleanable squeeze juicer according to the present application, the propelling screw 3 cooperates with the crushing portion 52 in the squeezing cylinder 5 to squeeze juice. Under the propelling and squeezing action of the propelling screw 3, the crushed material dregs and juice are moved forward to the filtering portion 50, then under the propelling action of the propelling screw 3 and the squeezing actions of the materials and the propelling screw 3, the juice-filtering gaps 7 between bars 51 are changed adaptively with the dimensions of the materials. If the dimensions of the materials are large, the juice-filtering gaps 7 are also large, thus under the squeezing action of the propelling screw 3, the juice can flow out via the juice-filtering gaps 7 between the bars 51. Then, under the propelling and squeezing action of the propelling screw 3, the material dregs are moved forward such that the material dregs are discharged out of the dregs outlet 44.

Compared with the conventional mesh structure, the juice can flow out timely and smoothly, and the juice-squeezing efficiency and the juice yield are high. In addition, the squeezed material dregs have a flat shape, and thus can not leak out through the juice-filtering gaps easily. Therefore, the squeeze juicer having the structure of the juice-filtering gaps 7 of the present application is especially applicable to be fed with materials continuously for a long time and can ensure a constant high juice yield. When a user needs to squeeze a lot of materials, there is no need for the user to frequently stop and disassemble the machine for cleaning, which improves the operating convenience and obtains a better applicable value. The juice flows out via the juice-filtering gaps 7 between the bars 51, thus the opportunities of the juice contacting the air and rubbing with the filtering portion 50 are reduced, thus the heat caused by the rubbing and the foam are reduced, thereby can maintain the inherent color and taste of the juice to the greatest extent and can reduce the nutrition loss.

Certainly, the person skilled in the art can understand that, the filtering portion 50 of the present application may also employ the following technical solutions.

Figure 4:
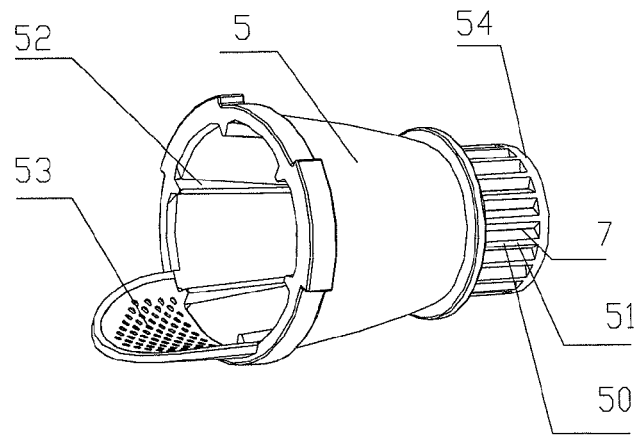
FIG. 4 is a second structure of the squeezing cylinder in FIG. 1.

In a second embodiment of the filtering portion 50 according to the present application, as shown in FIG. 4, the differences between the second embodiment and the first embodiment of the filtering portion 50 are that, in the second embodiment, the filtering portion 50 further includes an annular supporting bracket 54, one end of each bar 51 is fixedly provided on the end portion of the squeezing cylinder 5, and the other end of each bar 51 is fixedly connected to the annular supporting bracket 54. Compared with the first embodiment, both ends of each bar 51 are restricted, thus the elastic deformation is smaller. Therefore in the present embodiment, the static value of the juice-filtering gap 7 is 0.1 mm. In addition, differing from the first embodiment of the filtering portion 50, the preposed filtering portion 53 in the second embodiment is provided with a plurality of circular holes.

Figure 5:
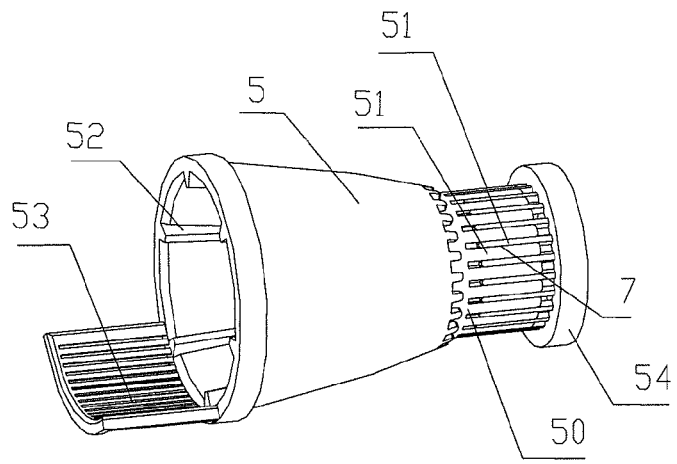
FIG. 5 is a third structure of the squeezing cylinder in FIG. 1.

In a third embodiment of the filtering portion 50 according to the present application, as shown in FIG. 5, the differences between the third embodiment and the first embodiment of the filtering portion 50 are that, the filtering portion 50 is formed by two groups of bars 51 insertedly connected with each other, juice-filtering gaps 7 are formed between adjacent bars 51, and the static value of each juice-filtering gap 7 is 0.15 mm; and the filtering portion 50 further includes an annular supporting bracket 54. In the third embodiment, the bars 51 in the two groups are arranged alternately, and one end of each bar in one group of bars 51 is fixedly provided on the end portion of the squeezing cylinder 5, and the other end thereof is free; one end of each bar in the other group of bars 51 is fixedly connected to the annular supporting bracket 54, and the other end thereof is free.

Figure 6:
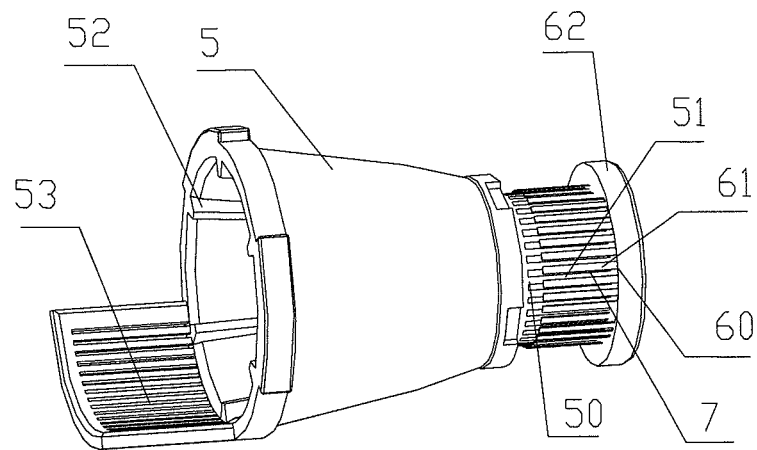
FIG. 6 is a fourth structure of the squeezing cylinder in FIG. 1.

In a fourth embodiment of the filtering portion 50 according to the present application, as shown in FIG. 6, the differences between the fourth embodiment and the second embodiment of the filtering portion 50 are that, the filtering portion 50 is surroundingly provided with an auxiliary filtering portion 60; the auxiliary filtering portion 60 includes a plurality of bars 61 and an auxiliary supporting bracket 62, one end of each bar 61 is fixedly provided on the auxiliary supporting bracket 62, the other end thereof is free; each two adjacent bars 51 and 61 are provided alternately, and a juice-filtering gap 7 is formed between the adjacent bars 51 and 61. In the fourth embodiment, the static value of each juice-filtering gap 7 is 0.2 mm. It should be noted that, since the filtering portion 50 is surroundingly provided with the auxiliary filtering portion 60, the dimension of each juice-filtering gap 7 can be adjusted by rotating the auxiliary filtering portion 60, i.e., by adjusting the position of the auxiliary filtering portion 60 with respect to the filtering portion 50. Therefore, a user can adjust the dimensions of the juice-filtering gaps 7 based on various situations, for example the materials or personal taste, to obtain material juice with different purities.

Certainly, the person skilled in the art can understand that, the filtering portion 50 of the present application is not limited to the above solutions, and any equivalent modifications and improvements made based on the present application are deemed to fall into the protection scope of the present application defined by the claims, which will not be illustrated herein.

A Second Embodiment

Figure 7:
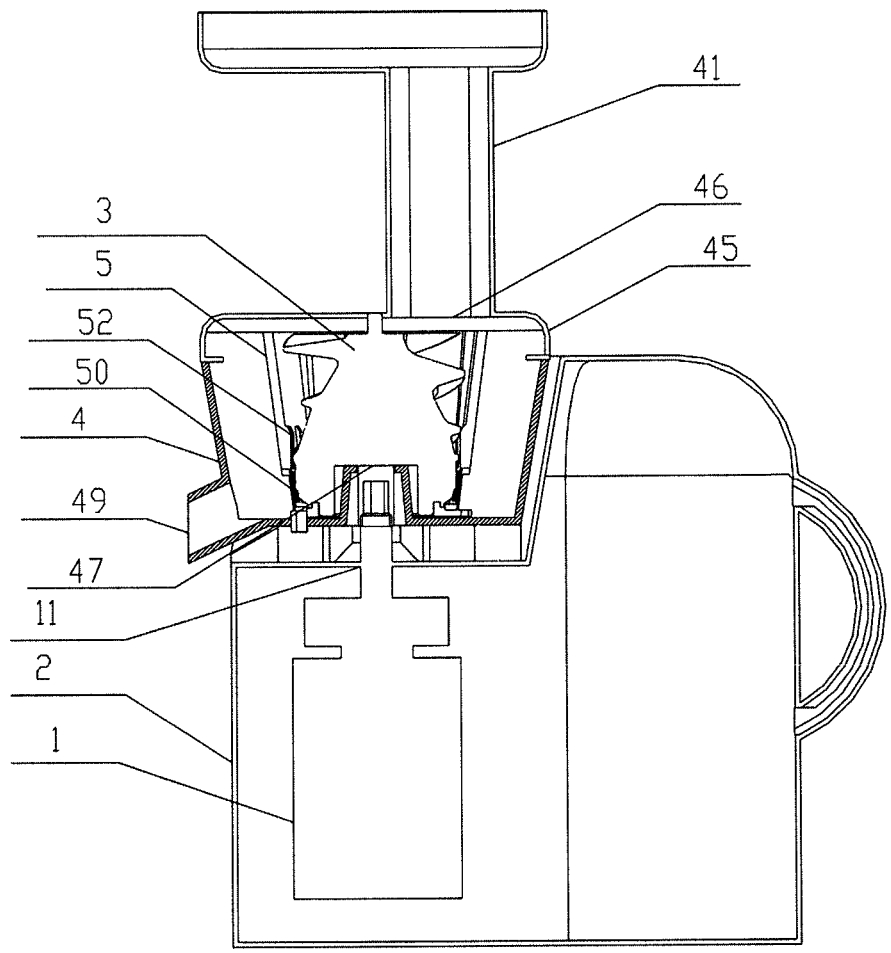
FIG. 7 is an easily-cleanable squeeze juicer according to a second embodiment of the present application.
Figure 8:
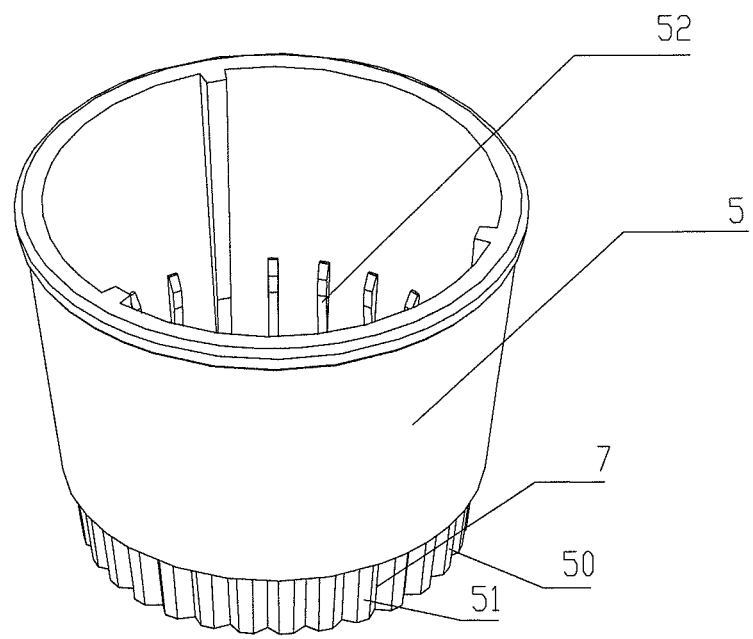
FIG. 8 is a first structure of a squeezing cylinder in FIG. 7.
Figure 9:
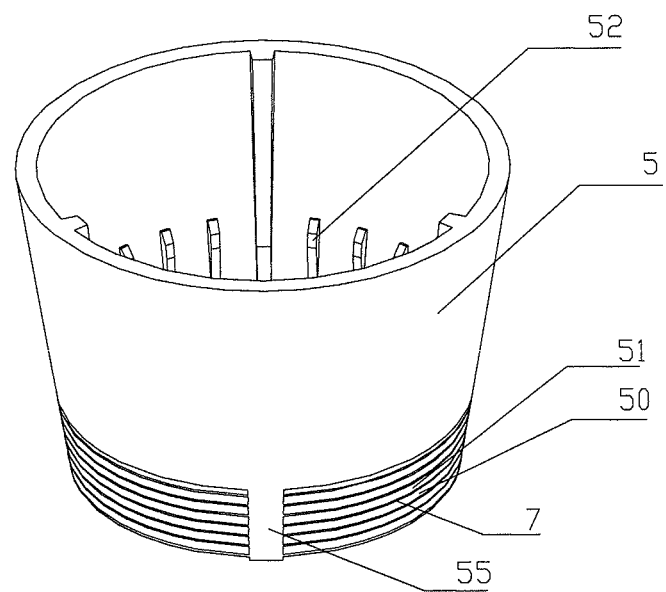
FIG. 9 is a second structure of the squeezing cylinder in FIG. 7.

In the easily-cleanable squeeze juicer according to a second embodiment of the present application, as shown in FIGS. 7 to 9, the differences between the easily-cleanable squeeze juicers according to the second embodiment and the first embodiment are that, in the second embodiment, the motor 1 is provided vertically, and the propelling screw 3, the squeezing cylinder 5 and the filtering portion 50 are provided longitudinally. The easily-cleanable squeeze juicer includes a feeding channel 41 and a chamber cover 45 which is capped on an upper end opening of the juice-collecting chamber 4. A feeding inlet 46 is formed in the chamber cover 45, and the feeding channel 41 is integrally provided on the feeding inlet 46, such that the feeding channel 41 can communicate with the feeding inlet 46. A lower end of the juice-collecting chamber 4 is mounted on the base 2, and a shaft hole 47 is formed in a lower end surface of the juice-collecting chamber 4. A motor shaft 11 passes through the shaft hole 47 to be connected to the propelling screw 3 provided in the squeezing cylinder 5. A dregs outlet is formed in a lower end of the juice-collecting chamber 4, and a juice outlet 49 is formed in a lower portion of a side wall of the juice-collecting chamber 4.

In an embodiment of the filtering portion 50 according to the present application, as shown in FIG. 8, the filtering portion 50 includes a plurality of bars 51. One end of each bar 51 is fixedly provided on an end portion of the squeezing cylinder 5, the other end of each bar 51 is free. Adjacent bars 51 form the juice-filtering gaps 7. In the present embodiment, the bars 51 and the juice-filtering gaps 7 are provided axially, a static value of the juice-filtering gap 7 is 0, and a sectional shape of each bar is of a triangular shape. Thus, when it needs to clean the filtering portion, since one end of each bar 51 is free, the filtering portion can be easily cleaned, even if there are materials clamped between the bars 51, the materials can be easily removed by moving the bars 51 with hands.

Certainly, the person skilled in the art can understand that, optionally, the filtering portion 50 according to the present application may also employ the following alternative technical solution. As shown in FIG. 9, the filtering portion 50 includes a plurality of girds 51 and a bracket 55. The bars 51 are of annular shapes, and the bracket 55 is an extension portion of the squeezing cylinder 4, the annular bars 51 are connected and are fixedly provided on an end portion of one end, having a smaller diameter, of the squeezing cylinder 4 via the bracket 55. Juice-filtering gaps 7 are formed between adjacent bars 51, and the juice-filtering gaps 7 are provided circumferentially. A static value of each juice-filtering gap 7 is 0.05 mm. Any modifications made based on the present application are deemed to fall into the protection scope of the present application, which will not be illustrated herein.

Other structures and advantageous effects of the easily-cleanable squeeze juicer in the present embodiment are the same as the first embodiment, which will not be described herein.

The above described embodiments are only preferred embodiments of the present application, and are not used to limit the implementation scope of the present application. Any equivalent modifications and improvements made based on the present application are deemed to fall into the protection scope of the present application defined by the claims, which will not be illustrated by examples herein.

What is claimed is:

1. An easily-cleanable squeeze juicer comprising a base, a motor, a juice-collecting chamber, a squeezing portion and a filtering portion, wherein the squeezing portion comprises a propelling screw and a squeezing cylinder cooperated with the propelling screw and being provided in the juice-collecting chamber, and the filtering portion is provided at a position downstream of the squeezing cylinder; wherein, the filtering portion comprises a plurality of bars which are provided surrounding a circumference of the propelling screw, and juice-filtering gaps are formed between each two adjacent bars, and the juice-filtering gaps are changeable with dimensions of materials under a squeezing action applied by the propelling screw to the materials; and one end of each bar is fixedly provided on an end portion of the squeezing cylinder, and the other end of each bar is free.

2. The easily-cleanable squeeze juicer according to claim 1, wherein a range of a static value I of each juice-filtering gap is that $0 \leq I \leq 0.2$ mm.

3. The easily-cleanable squeeze juicer according to claim 1, wherein the filtering portion comprises two groups of bars and an annular supporting bracket, and the juice-filtering gaps are formed between adjacent bars, wherein one end of each bar in one group of bars is fixedly provided on an end portion of the squeezing cylinder, and the other end of each bar is free; one end of each bar in the other group of bars is fixedly connected to the annular supporting bracket, and the other end of each bar is free.

4. The easily-cleanable squeeze juicer according to claim 1, wherein an auxiliary filtering portion is surroundingly provided on the filtering portion, the auxiliary filtering portion comprises an auxiliary supporting bracket and a second plurality of bars fixedly connected to the auxiliary supporting bracket, and the juice-filtering gaps are formed between adjacent bars.

5. The easily-cleanable squeeze juicer according to claim 1, wherein the propelling screw is provided longitudinally or transversely.

6. The easily-cleanable squeeze juicer according to claim 1, wherein the filtering portion and the squeezing cylinder are formed into one piece.

7. The easily-cleanable squeeze juicer according to claim 1, wherein a sectional shape of each bar is of a triangular shape, a trapezoidal shape, a circular shape, a rectangular shape, a rhombic shape, or an oval shape.

* * * * *